(12) United States Patent  
Nozaki et al.

(10) Patent No.: US 8,862,624 B2  
(45) Date of Patent: Oct. 14, 2014

(54) ACCESS CONTROL TO RESOURCE CONTENT

(75) Inventors: Hiroshi Nozaki, Sagamihara (JP); Tohru Tachibana, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 2058 days.

(21) Appl. No.: 11/561,440

(22) Filed: Nov. 20, 2006

(65) Prior Publication Data

US 2007/0143292 A1 Jun. 21, 2007

(30) Foreign Application Priority Data

Dec. 19, 2005 (JP) ................................. 2005-364834

(51) Int. Cl.
 *G06F 7/00* (2006.01)
 *G06F 17/30* (2006.01)
 *G06F 21/62* (2013.01)
(52) U.S. Cl.
 CPC .................................. *G06F 21/6227* (2013.01)
 USPC ............................ 707/786; 707/829; 707/694
(58) Field of Classification Search
 USPC ........................ 707/9, 999.009, 786, 829, 694
 See application file for complete search history.

(56) References Cited

U.S. PATENT DOCUMENTS

| 5,930,792 A | * | 7/1999 | Polcyn | 707/9 |
| 2003/0167269 A1 | * | 9/2003 | Gupta | 707/9 |
| 2007/0100834 A1 | * | 5/2007 | Landry et al. | 707/10 |

FOREIGN PATENT DOCUMENTS

| JP | 2002116934 | 4/2002 |
| JP | 2003091448 | 3/2003 |
| JP | 2003280990 | 10/2003 |

* cited by examiner

*Primary Examiner* — Alexey Shmatov  
(74) *Attorney, Agent, or Firm* — James L. Baudino

(57) ABSTRACT

A method, system, and computer program product are provided for performing access control. Regarding an arbitrary document or the like in a logical hierarchy structure, there is provided a method for determining whether a range of access authority set for a certain user with respect to a document or the like exceeds a range of access authority set for the user with respect to the folder positioned immediately above the folder is provided, when a change in contents of the access authority set for each user or a new document or the like by being moved or copied from another document is created or the documents moved or copied. Where the exceeding is determined, a new folder for direct access is created and access authority is set equal to or exceeds the range of access authority determined to exceeding the range of access authority set for the user.

19 Claims, 9 Drawing Sheets

ACCESS CONTROL TO RESOURCE CONTENT

BACKGROUND OF THE INVENTION

Technical Field

The present invention relates to access control to resource contents in a contents sharing system by multi-user. Particularly, the present invention relates to a method, a system, and a computer program product for making it possible to perform access control to resource contents based on a setup of free and flexible access authority in a contents sharing system by multi-user.

Recently, there has been widely used a network-based computer system, which is constituted by a plurality of computers, such as client computers and a server computer, and a plurality of I/O devices, connected through a network, such as the Internet and an intranet (including an intra-company LAN). Generally, in such a computer system, a plurality of users can access the same "resource content" (also simply referred to as "resource" or "content") stored in a certain computer on the network (for example, a server computer), and thus it is referred to as a "contents sharing system by a plurality of users (multi-user)."

Here, the "resource content" includes a "document" (also referred to as "document file" or simply "file") stored in the computer, and a "folder" which can conceptually have one or more documents for convenience of access to the documents, and it is possible to hierarchically manage the respective documents in each folder by configuring the folders logically associated with each other and hierarchically arranged as if they are connected with each other in a tree form (branches).

That is, the single folder of the uppermost hierarchy (the 0th hierarchy) equivalent to the root of the tree, referred to as a root folder, can have one or more documents, as well as one or more top level folders (folders of the first hierarchy), and each of these top level folders can also have one or more documents and one or more folders of the second hierarchy.

Thus, the folders from the root folder as the uppermost hierarchy through the folders located in the lowermost hierarchy are connected with each other in the tree form to constitute the logical hierarchy structure, and the respective folders in this tree-type hierarchy structure can have one or more documents, thereby making it possible to hierarchically manage all the documents stored in this computer or the like.

FIG. 1 illustrates an example of the logically hierarchy structure of the resource contents. A folder 110 has a document 120 and a folder 130. The folder 130 further has documents 140, 150, and 160.

This logical hierarchy structure of the resource contents is achieved in practice using a linkage mechanism for reference to the resource contents. It achieves the management of the resource contents using the logical hierarchy structure, wherein a "link table" is provided in the computer (for example, provided in the server computer as a database), which specifies whether the resource content of a certain "source (transmission source)" can directly refer to (access) the resource content of a certain "target (destination)" for some combinations of the resource contents serving as a source and a target, so that application software regarding this linkage mechanism for reference determines the relation among the resource contents which can be referred to based on the contents of this link table.

For example, in the case of the logical hierarchy structure of the resource contents illustrated in FIG. 1, it is achieved by having the link table illustrated in Table 1. As this Table 1, each link from the source to the target is represented as each entry in the link table. Here, a "link type" is like a distinguishing mark for each link, which can be defined for every application software, and an arbitrary value can be assigned thereto. In Table 1, a character string "FOLDER" is assigned.

TABLE 1

LINK TABLE

| SOURCE | TARGET | LINK TYPE |
|---|---|---|
| FOLDER 110 | FOLDER 130 | FOLDER |
| FOLDER 110 | DOCUMENT 120 | FOLDER |
| FOLDER 130 | DOCUMENT 140 | FOLDER |
| FOLDER 130 | DOCUMENT 150 | FOLDER |
| FOLDER 130 | DOCUMENT 160 | FOLDER |

In the "contents sharing system for a plurality of users" described above, generally, each of the users can access (Read, Write, or the like) an arbitrary resource content, such as the document and the folder, belonging to the arbitrary folder in the tree-type logical hierarchy structure. However, if any access control for each user is not performed, it is undesirable due to the following reasons: it causes a security problem in which the document or the like which is intended to be accessed by only a certain user may be accessed by other users; and it decreases a user interface (namely, operability) for the user due to numerousness of the documents and complexity of the hierarchy, since a document which is not needed to be accessed by the user but may be viewed by the same user. Hence, in order to prevent these problems, the detailed access control for each user is performed by setting "access authority" to the respective users or user groups, which indicates the type of access permitted to the user or the user group to perform for the respective resource contents, such as the folder and the document, in this tree-type logical hierarchy structure.

The list set for the resource contents to which the access should be controlled and indicates access authority of the respective users for the resource contents (namely, the list which indicates what type of access authority is given to which user or user group) is referred to as an "access control list (ACL)."

The ACL includes a "folder ACL" which controls the access to the folder, and a "document ACL" which controls the access to the document. Meanwhile, as access types, there are a wide range of access types including "Read," which permits reference to the document or the like, "Write," which permits modification of the document or the like, as well as "Delete," "Execute," "Print," "Authority Change," "Download," "Create," or the like, and a user-defined authority can also be added. When a certain folder ACL is set for a certain folder located in a certain hierarchy in the tree-type logical hierarchy structure, access authority for all the resource contents located in the levels lower than this folder is limited based on this folder ACL setting, so that the access based on the authority broader than this access authority cannot be performed practically.

In the example illustrated in FIG. 1, it is shown that the folder ACL, "permits only read access to the respective users A, B, and C (Read: A, B, C)," is set for the folder 110, which means that the users A, B, and C are only permitted to perform the read access to the folder 110 and are not permitted to perform other types of access such as the write access, and also shown that the users other than the users A, B, and C are not permitted to perform even the read access. In addition, the folder 130 immediately under the folder 110 cannot perform access based on authority broader than authority "permits only read access to the respective users A, B, and C (Read: A, B, C)," set in the folder 110, as can be seen in the example of the figure where the ACL with narrower authority, "permits only read access to the respective users A and B (Read: A, B)," is set.

As described above, in the contents sharing system by a plurality of users, the access control of the plurality of users is conventionally performed based on the ACL setting corresponding to the resource contents management based on the tree-type logical hierarchy structure (so-called hierarchical ACL model). Although this hierarchical ACL model has advantages in that the access authority can be managed with the hierarchy of the folder, and that different ACLs can be set for every document within a limit of the folder ACL of the folder in its higher level, it also has disadvantages in that the access authority for the lower-level resource content is limited in accordance with the setting of the folder ACL of the higher-level folder under the usual user interface, which accesses the document by sequentially pursuing from the top folder to the lower-level folder, and thus the setting of a certain ACL may be meaningless depending on the combination of this ACL and the higher-level folder ACL, resulting in the ACL not being set as desired.

For example, in FIG. 1, the document ACL, "permits read access and write access to the user B (Read: B, Write: B)," is set for the document 160 under the folder 130, though this document ACL setting is based on the authority broader than that of the folder ACL setting for the folder 130, resulting in the access to the document 160 being limited by the authority based on the ACL setting for the folder 130 of its higher level. Consequently, a portion of this document ACL beyond the folder ACL for the folder 130, namely, the setting of the access authority, "permits write access to the user B (Write: B)," does not function effectively, resulting in meaningless setting. In this case, if the folder ACL setting for the folder 130 is changed in accordance with this document ACL setting, the access to all the documents under the folder 130 would be affected by the changed ACL setting. As a result, it is not desirable because this document ACL setting functions effectively, but at the same time, this change makes it possible to impart the access authority with unnecessarily broader range to all the other documents belonging to the folder 130. Furthermore, in FIG. 1, the document ACL, "permits read access and write access to the users A, B, and C (Read: A, B, C, Write: A, B, C)," is set for the document 120 immediately under the folder 110. However, it is based on the authority broader than that of the folder ACL setting for the folder 110 immediately above it, so that, in a manner similar to the case described above, a portion of this document ACL beyond the range of the folder ACL setting for the folder 110, namely, the access authority setting, "permits write access to the users A, B, and C (Write: A, B, C)," does not function effectively, resulting in the meaningless setting.

As described above, in the conventional hierarchical ACL model, it is impossible to deal with the case where the document is intended to be accessible to the users other than those with permission by the folder ACL setting of the higher-level (immediately above) folder.

In order to deal with these problems, there may be considered a method of, for using a combination of the ACL model for setting the same ACL to all the resource contents ("Same ACL model"), and the ACL model for setting the folder ACL, "permits all the access authorities to all the users (Public)," for all the folders to thereby control it only by the document ACL setting ("Public ACL model"). FIG. 2 illustrates an example of the access control by this combination model. In this figure, two ACL models are combined. The same ACL model is applied to the resource content of a top level folder 210 on the right of the first hierarchy and its lower levels, where the resource content which may be managed under the same access authority are arranged here. As for a root folder 200, as well as a top level folder 220 on the left of the first hierarchy and its lower-level folders, the folder ACL is set to Public, so that the access control to the respective documents is performed by variously setting the document ACL for every document.

This method makes it possible for the documents to be managed by the document ACLs of the documents located in each hierarchy, without considering the folder ACL, and the respective combined ACL models will also be simple and straightforward. However, since the method does not hierarchically manage the documents using the folder ACL for the folders arranged hierarchically, there are disadvantages, for example, it becomes meaningless to arrange the folders into the tree-type logical hierarchy structure, it is undesirable in view of security or privacy protection because folder names or document names are open to all the users due to the folder ACL being set to Public, and thus these names help to guess the content thereof to some extent, it causes the maintenance to be troublesome as the number of documents increases because it requires the precise ACL setting for all the documents, and the top level folders (folders in the first hierarchy immediately under the root folder) are required for the number of ACL models to be combined and thus it becomes inconvenient to use in terms of the user interface as the number of top level folders increases.

Moreover, as reference art of the present invention, there are some articles regarding a setting method of the ACL. The art described in Japanese Unexamined Patent Publication (Kokai) No. 2002-116934 is about a system for dynamically controlling the access authority for individual contents (resource contents) based on a state or attribute of the content at the time when the access occurs. The art described in Japanese Unexamined Patent Publication (Kokai) No. 2003-91448 is a document management system having a function which changes, for example, the access authority to the document and folder collectively, wherein this function is disabled when the access authority of the user or user group is preset and it is specified (by the user) not to perform change or the like of the access authority directed by the user, and wherein the access authority is merged and set when the access authority of the user or user group is preset and it is specified (by the user) to merge the access authority directed by the user. Furthermore, the art described in Japanese Unexamined Patent Publication (Kokai) No. 2003-280990, associates user attribute information (such as post information of an organization and the range of official authority) with the type of access authority for every document and sets the ACL by connecting it to the user attribute information for the attempt of reducing the burden of review of the group configuration upon reorganization and other maintenance works which have been required when the access authority has been managed only by a user ID.

Although each of the reference arts can set the ACL afterward or flexibly, the set ACL is premised to follow the limit in the conventional hierarchical ACL model. In other words, the access authority for the lower-level resource content is limited by the access authority based on the folder ACL set for the upper-level folder. Hence, the reference arts above do not fundamentally solve the above-mentioned problems.

SUMMARY OF THE INVENTION

Therefore, the present invention aims at solving the above-mentioned problems upon using the existing hierarchical ACL model for a contents sharing system for multi-user and providing a method, a system, and a computer program product for performing access control which can set access authority freely and flexibly. This object is achieved by the combinations of features described in the independent claims. The dependent claims define further advantageous examples of the present invention.

In order to solve the problems described above, the present invention provides a method of managing access to documents or folders by users, by a computer in accordance with access authority set for each user with respect to each document or folder in a contents sharing system, the method comprising the steps of: determining, for an arbitrary document or folder in a logical hierarchy structure under a root folder, whether or not a range of access authority set for at least one user with respect to the document or folder exceeds a range of access authority set for the user with respect to a folder positioned immediately above the document or folder in the hierarchy structure, in response to change in contents of the access authority set with respect to the document or folder, or in response to creation of a new document or folder by being moved or copied from another document or folder; creating, in the case where the exceeding is determined in the determining step a new folder for direct access immediately under a predetermined folder in the hierarchy structure, and setting access authority with respect to the folder for direct access with a range equal to or exceeding the range of access authority set for the user with respect to the document or folder; and creating an access link with the folder for direct access as a source and the document or folder as a target, subsequent to the creation and setting step, and the present invention also provides as a system which can carry out the method and a program product for causing the computer to execute the method.

Moreover, the present invention provides a method of managing access to documents or folders by users by a computer in accordance with access authority set for each user with respect to each document or folder, in a contents sharing system, the method comprising the steps of: determining, for an arbitrary document or folder in a logical hierarchy structure under a root folder, whether or not a range of access authority set for at least one user with respect to the document or folder exceeds a range of access authority set for the user with respect to a folder positioned immediately above the document or folder in the hierarchy structure, in response to change in contents of access authority set for the document or folder or in response to creation of a new document or folder by being moved or copied from another document or folder; a creating, in the case where the exceeding is determined in the determining part, a new folder for direct access immediately under a predetermined folder in the hierarchy structure, and setting access authority with respect to the folder for direct access with a range equal to or exceeding the range of access authority set for the user with respect to the document or folder; creating an access link with the folder for direct access as a source and the document or folder as a target, subsequent to the creating and setting step; displaying a list of all the folders for direct access in which access authority for the user is set for the user, in response to a request by the user; and creating, for each of all the displayed folders for direct access, a second access link with the predetermined folder as a source and the folder for direct access or the document or folder of the link destination of the folder for direct access as a target, in response to designation by the user to intend to access the document or folder at a link destination of the folder for direct access from an existing predetermined folder to which the user can access other than all the folders for direct access, and the present invention also provides a system which can carry out the method, and a program product for causing the computer to execute the method.

Note herein that the brief description of the invention described above does not cite all features required for the present invention, and the combinations constituted by a part of this plurality of features of the invention may also be considered as the invention.

According to the present invention, in the contents sharing system for multi-user, the setting of the access control can be performed freely and flexibly without being bound by the limit of the setting of access authority in the conventional access control model.

BRIEF DESCRIPTION OF THE DRAWINGS

FIG. 5 schematically illustrates the manner in which stored contents are managed by an application software or the like;

DETAILED DESCRIPTION OF THE INVENTION

Hereinafter, the best modes (hereinafter, embodiments) for carrying out the present invention will be described in detail with reference to the accompanying drawings, but these embodiments do not limit the invention according to claims and all the combinations of the features described in the embodiments are not necessarily indispensable to the means for solving the problems.

Figure 1:
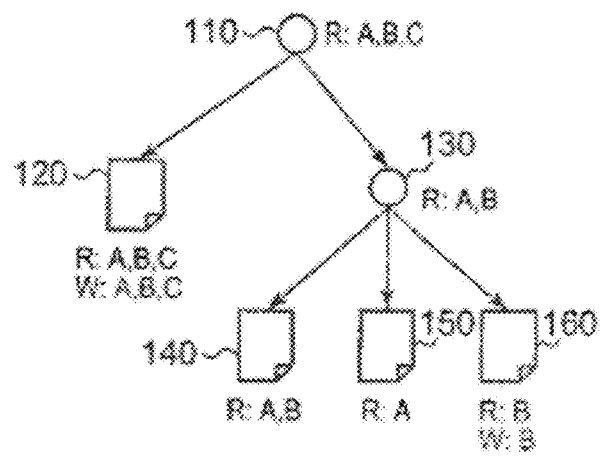
FIG. 1 illustrates an example of a tree-type logical hierarchy structure of resource contents.
Figure 2:
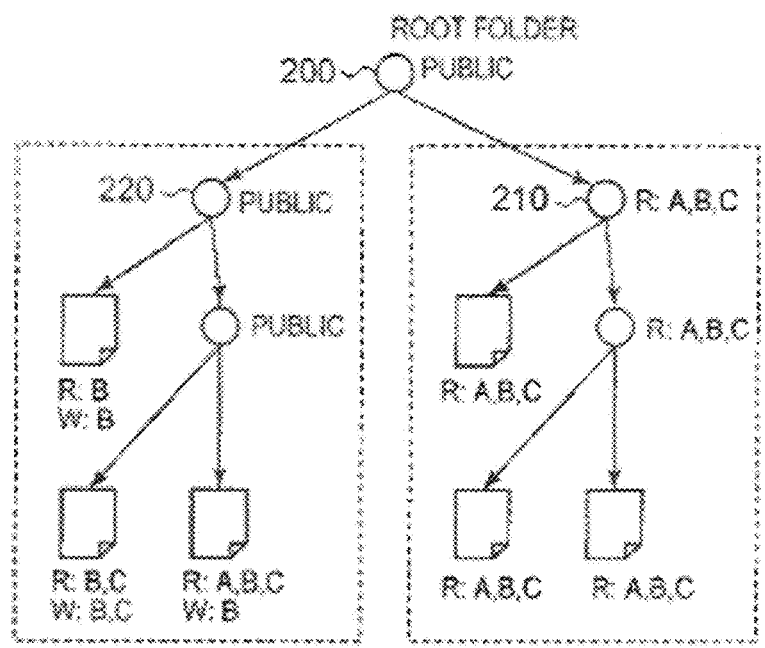
FIG. 2 illustrates an example of access control by a combination model of two kinds of access control models.
Figure 3:
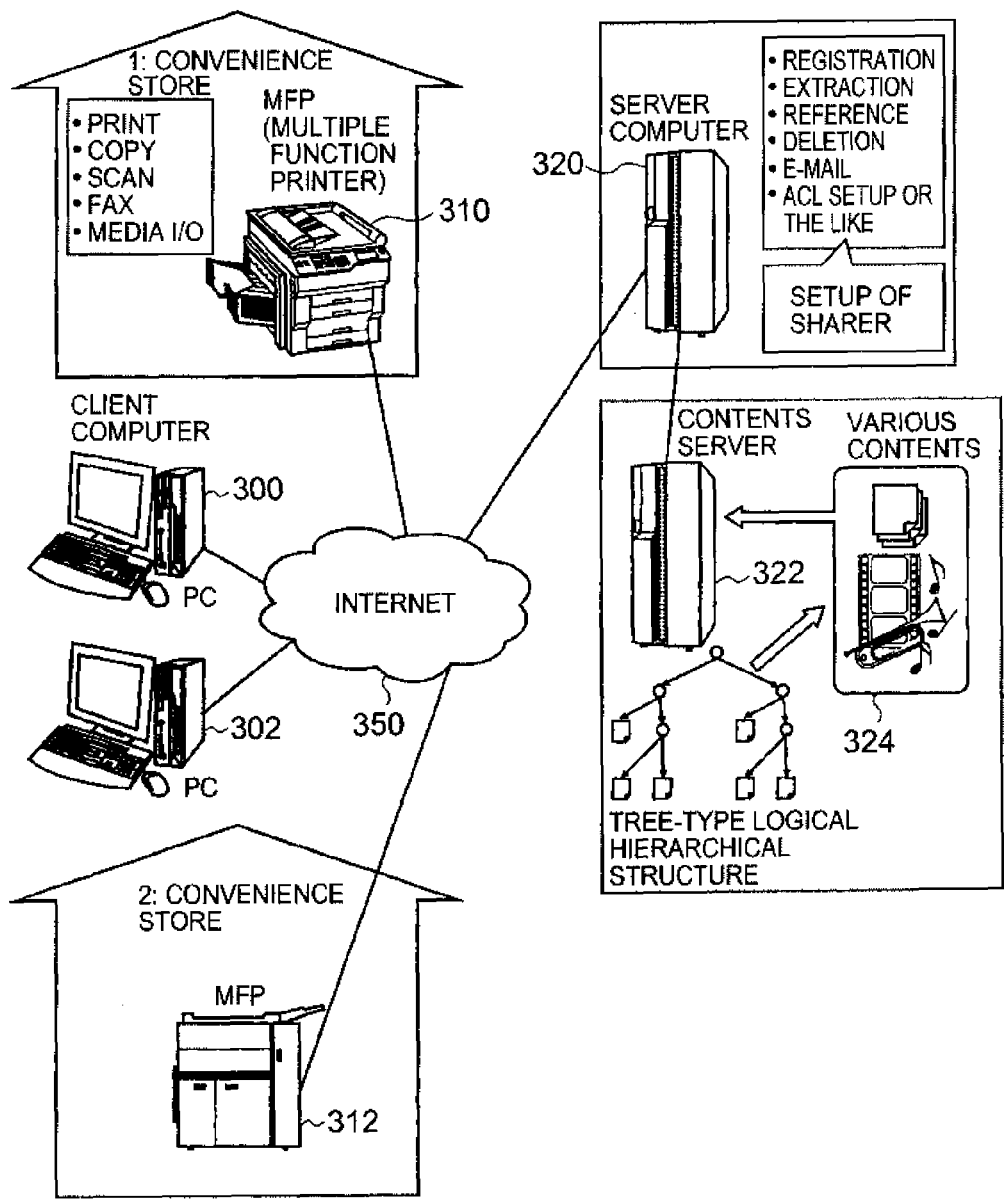
FIG. 3 illustrates an example of a system environment of a contents sharing system for multi-user regarding carrying out of the present invention.

FIG. 3 illustrates an example of a system environment of a contents sharing system for multi-user where the present invention is carried out.

In the system in FIG. 3, a plurality of client computers (client terminals) 300, 302, and a plurality of I/O devices 310, 312 are connected to a server computer 320 through a network 350 such as the Internet, and the server computer 320 is further connected locally with a content server 322 for collectively storing various contents. The server computer 320 manages access to various contents stored in the content server 322, which achieves various functions, such as registration, retrieval, reference, and deletion of the content stored in the content server 322, setting of an ACL (namely, setting of a sharer), and mailing, for a user who accesses this server computer, using some server application software operated on an operating system such as AIX™ and UNIX™, for example. The server computer 320 and the content server 322 can be combined and regarded as one database system which manages one or more databases constituted by these content. While only one content server is illustrated in the example in FIG. 3, a plurality of content servers may be obviously connected to the server computer 320. It is also possible to provide all the content to a storage of the server computer 320 or the like, without arranging the content server independently. Moreover, while only one server computer is illustrated in FIG. 3, this system environment may obviously include a plurality of server computers connected to the network 350.

The client computers 300, 302 are personal computers having client application software operated on a Windows™ operating system, for example, and the I/O devices 310, 312 are referred to as an MFP (Multiple Function Printer) placed, for example, in a convenience store or the like, which has a plurality of functions such as print, copy, scan, facsimile, and media I/O in one set. Each user can access the document (namely, content) stored in the server computer using the client computers 300, 302, or the I/O devices 310, 312.

Figure 4:
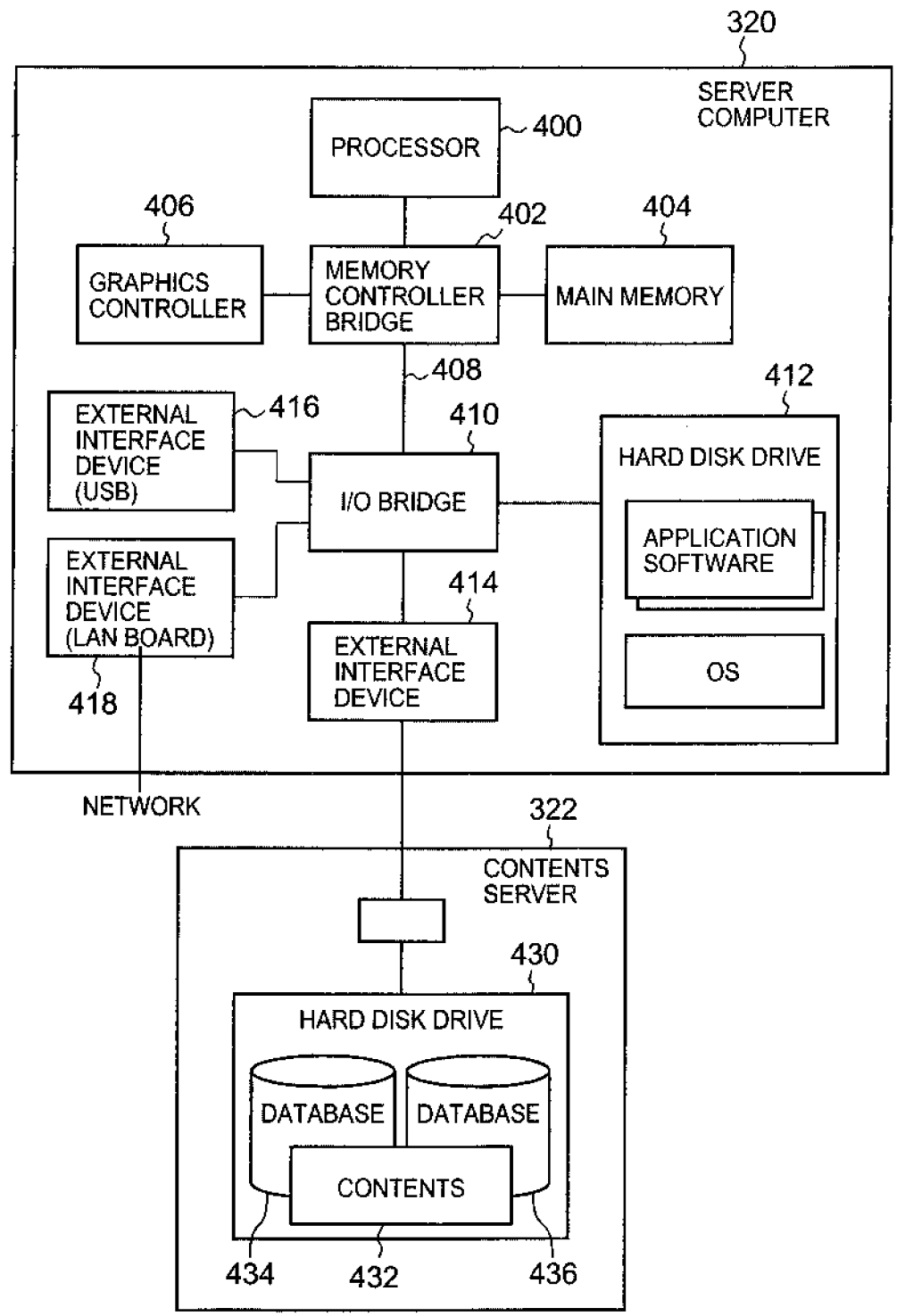
FIG. 4 illustrates a typical configuration example in more detail of the server computer in FIG. 3.

FIG. 4 illustrates an example of a typical configuration in more detail of the server computer 320 in FIG. 3. In this configuration, a memory controller bridge 402 (also referred to as a memory bridge or a first bridge) is connected closely to a processor 400 (also referred to as a central processing unit, a CPU, or a main processor) which manages overall control of this server computer 320, and this memory controller bridge 402 is connected directly with a main memory 404 (also referred to as a memory or a main storage) and a graphics controller 406 to mainly perform processing which requires high speed. To this memory controller bridge 402, an I/O controller bridge 410 (also referred to as an I/O bridge or a second bridge) is also connected through a bus such as a PCI local bus 408, and this I/O controller bridge 410 is connected with a hard disk drive 412 (also referred to as an HDD, a hard disk, a hard disk storage, or a fixed storage) in which the operating system or a program such as the application software required to carry out the present invention can be stored. In addition to this, the I/O controller bridge 410 is connected with various types of external interface devices 414, 416, and 418, and, through one of them 414, is connected locally to the content server 322 in FIG. 3, namely, a hard disk drive 430 which constitutes this content server 322, and thus making it possible to store various contents 432 therein to be collectively managed to thereby configure one or more databases 434, 436. Alternatively, as described above, part or all of the various contents may be stored in the hard disk drive 412 of the server computer 320 in FIG. 3. Furthermore, it can be connected with the network 350 in FIG. 3 through another external interface device 418, thus making it possible to access from the client computers 300, 302 or the I/O devices 310, 312 connected to this network 350 to the content 432.

Figure 5:
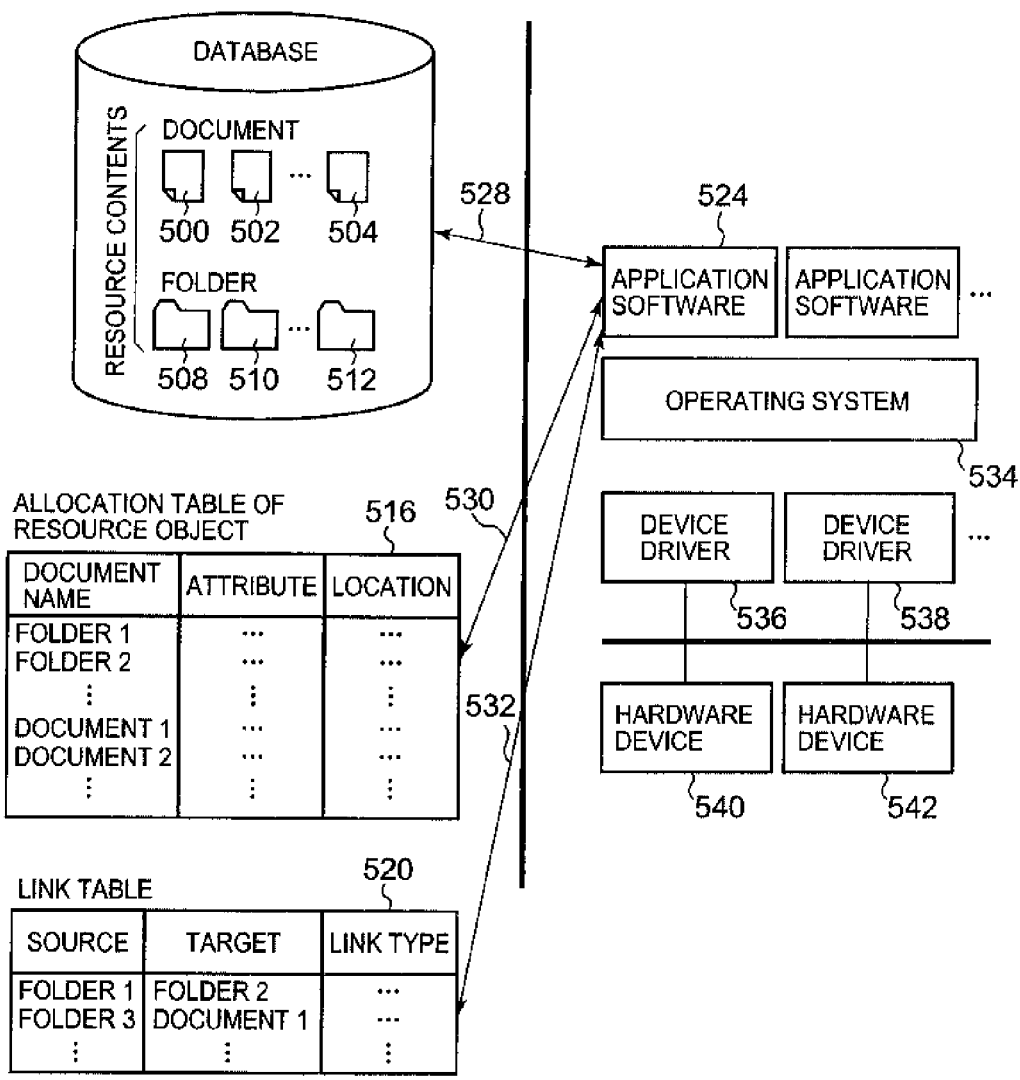

FIG. 5 schematically illustrates how the contents (resource contents) stored in the hard disk drive 430 in the content server 322 in FIG. 4 are managed by the application software or the like. While the content server 322 stores actual data of the resource contents such as documents 500, 502, and 504, or folders 508, 510, and 512, a storage region of the hard disk drive 430 in the content server 322 and/or the hard disk drive 412 of the server computer 320 also has an allocation table 516 for describing the relation between the respective resource contents with their attributes and stored locations of the actual data, required when the application software accesses these resource content. If the resource contents are the documents, the attribute includes a document name (document file name), a creator, creation (update) date and time, an extension (file type), the document ACL, or the like, and if the resource contents are the folders, the attribute includes a folder name, the creator, the creation (update) date and time, the folder ACL, or the like. As described above, this storage region also has a link table 520 for describing the reference relation among the respective resource contents, so that application software 524 can accurately comprehend the logical hierarchical relation among the respective resource contents by referring to the content of this link table 520. Similarly, the present invention is carried out for the application software 524 which is usually stored in the hard disk drive 430 in the content server 322 and loaded on the main memory if required to suitably perform required accesses 528, 530, and 532 to the data stored in this storage region, if needed. As shown in the right half in FIG. 5, the application software 524 operates based on the control by an operating system 534 and uses an open function of the operation system if needed, so that the control is passed to the operation system through an API (Application Programming Interface) as the interface of a function call form and further passed from this operating system 534 to device drivers (device drive programs) 536, 538 for the respective hardware devices, and the respective hardware devices 540, 542 (for example, the hard disk drive) function under the control to thereby perform actual data exchange among each hardware devices including the processor. In other words, this application software 524 causes the hardware resource (the processor, the main memory, the hard disk drive, or the like) of the computer to perform a procedure according to the method of the present invention or causes the hardware resource (the processor, the main memory, the hard disk drive, or the like) of the computer to function as means according to the method of the present invention.

Under the above system environment, embodiments of the present invention will be described hereinbelow.

As a first embodiment of the present invention, there will be firstly described a case where the ACL of an arbitrary resource content in the tree-type logical hierarchy structure is changed. FIGS. 6A through 6D illustrate the mode in which the first embodiment of the present invention is carried out for the tree-type logical hierarchy structure of the resource contents configured in the server computer 320 and the content server 322 of the contents sharing system for multi-user in FIG. 3. FIG. 7 illustrates a flow of whole processing of the first embodiment of the present invention.

Figure 6A:
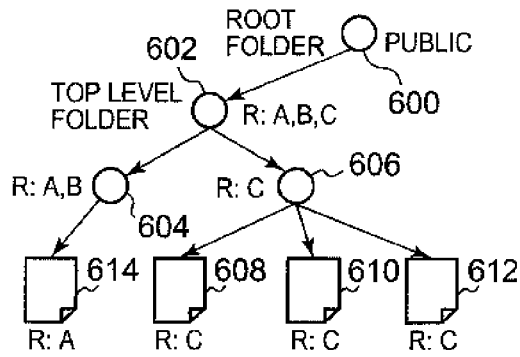
FIGS. 6A to 6D illustrate the manner in which a first embodiment according to the present invention is carried out for the tree-type logical hierarchy structure of the resource contents in the contents sharing system for multi-user in FIG. 3.
Figure 7:
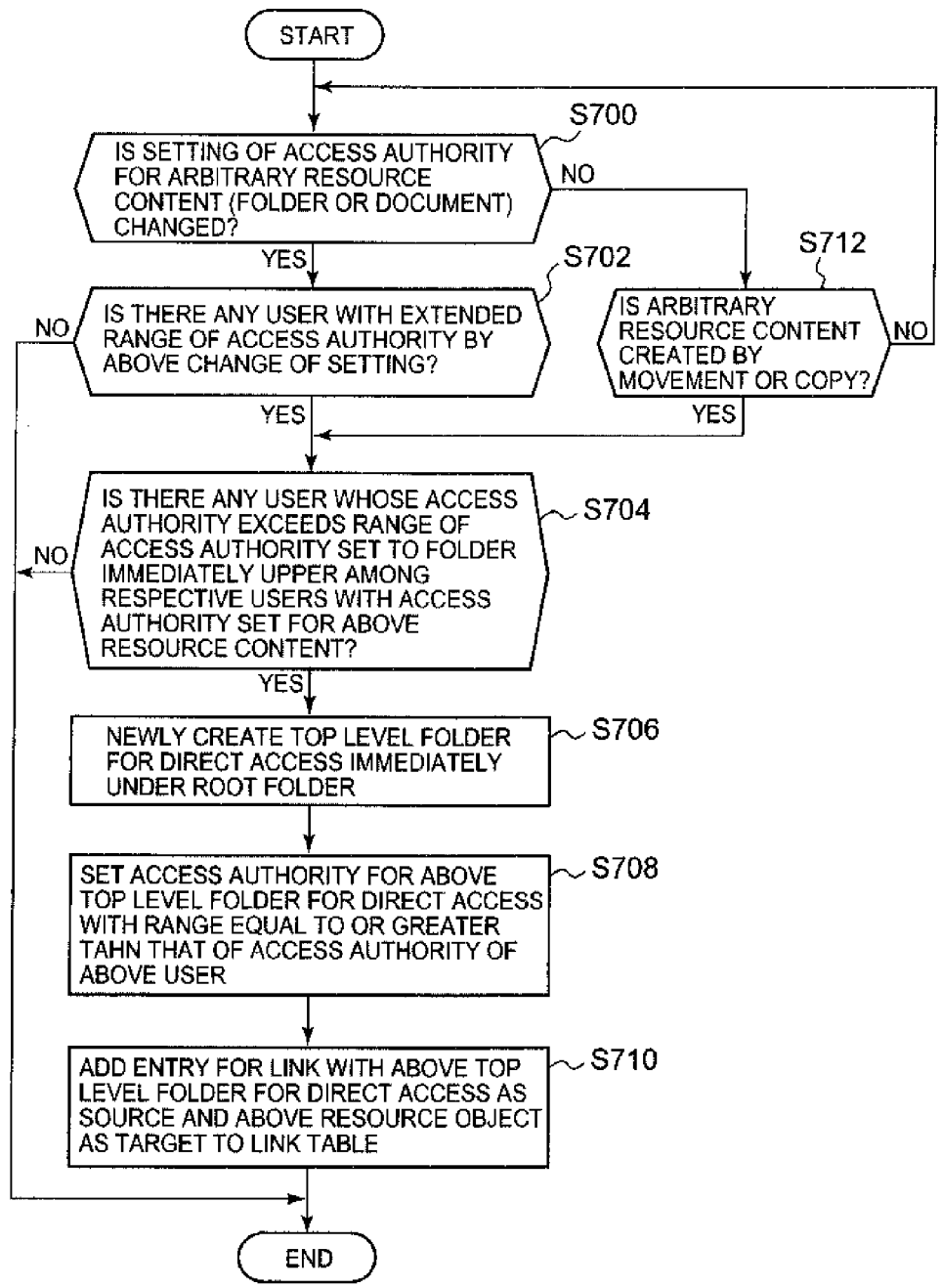
FIG. 7 illustrates a flow of whole processing regarding carrying out of the present invention.

FIG. 6A illustrates an initial state. One top level folder 602 is arranged immediately under a root folder 600, and the ACL, "permits read access to users A, B, and C (Read: A, B, C)," is set for this top level folder 602. In addition, folders 604, 606 are arranged immediately under the top level folder 602, and the ACL, "permits read access to the user C (Read: C)," is set for the folder 606. Since the range of access authority of this ACL setting is narrower than that set in the top level folder 602 immediately above it (namely, the read access from users A and B is permitted to the top level folder 602 but not permitted to the folder 606), it is not the meaningless setting, but functions effectively. Moreover, the folder 606 has three documents 608, 610, and 612, and the ACL, "permits read access to the user C (Read: C)," is set for each of them.

Figure 6B:
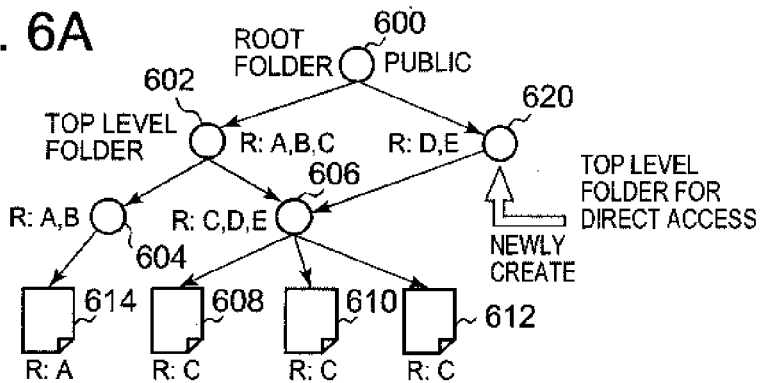

As shown in FIG. 6B, when access authority is changed so as to permit the read access to the folder 606 by users D and E (namely, the ACL setting for the folder 606 is set as "Read: C, D, E"), the processing proceeds to the step to then determine whether or not the top level folder for direct access should be newly created immediately under the root folder 600 (Yes at S700 in FIG. 7). First, since the ACL setting for the folder 606 is changed from "Read: C" to "Read: C, D, E," it is determined that access authority of users D and E is extended (namely, it is changed from the state where nothing is permitted to the state where reading is permitted) while access authority of user C is unchanged, and thus access authority for the folder 606 as a whole is extended compared to that before the ACL setting is changed (Yes at S702 in FIG. 7). Next, it is determined whether or not the extension of access authority of users D and E exceeds the range of access authority of users D and E for the top level folder 602 immediately above it (S704 in FIG. 7). The ACL setting for the top level folder 602 is "Read: A, B, C," which means that access authority of user C is not extended in this change of the ACL setting for the folder 606 but, because any access authority does not set for users D and E, access authority of users D and E is extended. For that reason, it is determined that the top level folder for direct access should be newly created, and a top level folder 620 is created immediately under the root folder 600 (S706 in FIG. 7).

This determination of "whether or not access authority for a certain user is extended" is carried out specifically as follows. That is, the ACL setting for the top level folder 602 is stored in a part of an attribute column of the allocation table 516 in FIG. 5, and the storage state thereof may be schematically illustrated as in Table 2(a), for example. Meanwhile, the ACL setting after the change for the folder 606 is stored in the same part as above of the attribute column of the allocation table 516, and the storage state thereof may also be schematically illustrated as in Table 2 (b). The application software reads out the storage state illustrated in Tables 2(a) and 2(b) (namely, the application software causes the hardware resources of the computer to carry out) to then search whether or not there is an item with a value "0" in Table 2(a) and a value "1" in Table 2(b) (combination of the type of the access authority and the user), and, when such item is present (in this example, the combinations of "Read"-user D and "Read"-user E), it determines that access authority is extended. In addition, it specifies the type of access authority (in this example, "Read") and the user (in this example, users D and E) regarding this item.

As for access authority for the folder 606 of users D and E, which is determined to exceed the range of access authority for the top level folder 602 immediately above it, the ACL regarding access authority with the range equal to or exceeding it is set in the top level folder 620 (S708 in FIG. 7). That is, the ACL, "permits read access to users D and E (Read: D, E)," is set in the top level folder 620.

TABLE 2

TYPE OF ACCESS AUTHORITY

| USER | Read | Write | Delete | Execute | Print | Download | Create | ... |
|------|------|-------|--------|---------|-------|----------|--------|-----|
| (a) STORAGE STATE OF ACL FOR TOP LEVEL FOLDER 602 | | | | | | | | |
| A | 1 | 0 | 0 | 0 | 0 | 0 | 0 | ... |
| B | 1 | 0 | 0 | 0 | 0 | 0 | 0 | ... |
| C | 1 | 0 | 0 | 0 | 0 | 0 | 0 | ... |
| D | 0 | 0 | 0 | 0 | 0 | 0 | 0 | ... |
| E | 0 | 0 | 0 | 0 | 0 | 0 | 0 | ... |
| : | : | : | : | : | : | : | : | ... |
| : | : | : | : | : | : | : | : | ... |

TABLE 2-continued

TYPE OF ACCESS AUTHORITY

| USER | Read | Write | Delete | Execute | Print | Download | Create | ... |
|------|------|-------|--------|---------|-------|----------|--------|-----|
| (b) STORAGE STATE OF ACL FOR FOLDER 606 | | | | | | | | |
| A | 0 | 0 | 0 | 0 | 0 | 0 | 0 | ... |
| B | 0 | 0 | 0 | 0 | 0 | 0 | 0 | ... |
| C | 1 | 0 | 0 | 0 | 0 | 0 | 0 | ... |
| D | 1 | 0 | 0 | 0 | 0 | 0 | 0 | ... |
| E | 1 | 0 | 0 | 0 | 0 | 0 | 0 | ... |
| : | : | : | : | : | : | : | : | ... |
| : | : | : | : | : | : | : | : | ... |

By newly creating the top level folder 620 immediately under the root folder 600, a link with the root folder 600 as a source and the top level folder 620 as a target is additionally created in the link table automatically by the conventional mechanism. Aside from this, according to the embodiment of the present invention, the link for the top level folder 620 to refer to the folder 606 for the resource content is additionally created (S710 in FIG. 7). Tables 3(a)-(d) illustrate how the link table changes depending on the flows in FIGS. 6A through 6D. Namely, while the tree-type logical hierarchy structure of the initial resource content illustrated in FIG. 6A is achieved by the link table illustrated in Table 3(a), in response to the change of the ACL setting for the folder 606 illustrated in FIG. 6B, an entry (1) which defines the newly-created top level folder 620 as a source and the folder 606 as a target is additionally created in the link table as illustrated in Table 3(b), thus making it possible to refer to the folder 606 from the top level folder 620. Here, the top level folder 620 has the ACL setting regarding access authority equivalent to access authority of users D and E extended by the change of the ACL setting for the folder 606, so that user D or E who accesses the top level folder 620 can access (read) the folder 606 which is linked therefrom and includes equivalent access authority. As for the link type of this entry (1), in order to indicate that this link is from the top level folder for direct access which is newly created by carrying out the present invention, it is desirable to set a value different from that previously set to the respective entries. In Table 3, a value "DIRECT" is set.

TABLE 3

| SOURCE | TARGET | LINK TYPE |
|--------|--------|-----------|
| (a) LINK TABLE | | |
| ROOT FOLDER 600 | TOP LEVEL FOLDER 602 | FOLDER |
| TOP LEVEL FOLDER 602 | FOLDER 604 | FOLDER |
| TOP LEVEL FOLDER 602 | FOLDER 606 | FOLDER |
| FOLDER 604 | DOCUMENT 614 | FOLDER |
| FOLDER 606 | DOCUMENT 608 | FOLDER |
| FOLDER 606 | DOCUMENT 610 | FOLDER |
| FOLDER 606 | DOCUMENT 612 | FOLDER |
| (b) LINK TABLE | | |
| ROOT FOLDER 600 | TOP LEVEL FOLDER 602 | FOLDER |
| TOP LEVEL FOLDER 602 | FOLDER 604 | FOLDER |
| TOP LEVEL FOLDER 602 | FOLDER 606 | FOLDER |
| FOLDER 604 | DOCUMENT 614 | FOLDER |
| FOLDER 606 | DOCUMENT 608 | FOLDER |
| FOLDER 606 | DOCUMENT 610 | FOLDER |
| FOLDER 606 | DOCUMENT 612 | FOLDER |
| ROOT FOLDER 600 | TOP LEVEL FOLDER 620 | FOLDER |
| TOP LEVEL FOLDER 620 | FOLDER 606 | DIRECT ⇐ (1) |

TABLE 3-continued

| SOURCE | TARGET | LINK TYPE |
|---|---|---|
| (c) LINK TABLE | | |
| ROOT FOLDER 600 | TOP LEVEL FOLDER 602 | FOLDER |
| TOP LEVEL FOLDER 602 | FOLDER 604 | FOLDER |
| TOP LEVEL FOLDER 602 | FOLDER 606 | FOLDER |
| FOLDER 604 | DOCUMENT 614 | FOLDER |
| FOLDER 606 | DOCUMENT 608 | FOLDER |
| FOLDER 606 | DOCUMENT 610 | FOLDER |
| FOLDER 606 | DOCUMENT 612 | FOLDER |
| ROOT FOLDER 600 | TOP LEVEL FOLDER 620 | FOLDER |
| TOP LEVEL FOLDER 620 | FOLDER 606 | DIRECT⇐(1) |
| ROOT FOLDER 600 | TOP LEVEL FOLDER 622 | FOLDER |
| TOP LEVEL FOLDER 622 | FOLDER 610 | DIRECT⇐(2) |
| (d) LINK TABLE | | |
| ROOT FOLDER 600 | TOP LEVEL FOLDER 602 | FOLDER |
| TOP LEVEL FOLDER 602 | FOLDER 604 | FOLDER |
| TOP LEVEL FOLDER 602 | FOLDER 606 | FOLDER |
| FOLDER 604 | DOCUMENT 614 | FOLDER |
| FOLDER 606 | DOCUMENT 608 | FOLDER |
| FOLDER 606 | DOCUMENT 610 | FOLDER |
| FOLDER 606 | DOCUMENT 612 | FOLDER |
| ROOT FOLDER 600 | TOP LEVEL FOLDER 620 | FOLDER |
| TOP LEVEL FOLDER 620 | FOLDER 606 | DIRECT⇐(1) |
| ROOT FOLDER 600 | TOP LEVEL FOLDER 622 | FOLDER |
| TOP LEVEL FOLDER 622 | FOLDER 610 | DIRECT⇐(2) |
| ROOT FOLDER 600 | TOP LEVEL FOLDER 624 | FOLDER |
| TOP LEVEL FOLDER 624 | DOCUMENT 612 | DIRECT⇐(3) |

Figure 6C:
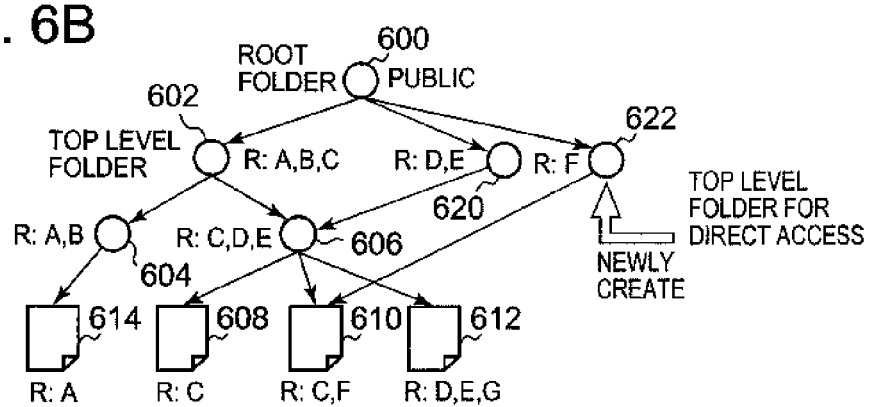

Similarly, as shown in FIG. 6C, when the access authority is changed so as to permit the read access to a document 610 belonging to the folder 606 by user F (namely, the ACL setting for the document 610 is set as "Read: C, D"), the processing proceeds to the step to determine whether or not the top level folder for direct access should be newly created immediately under the root folder 600 (Yes at S700 in FIG. 7). First, since the ACL setting for the document 610 is changed from "Read: C" to "Read: C, F," it is determined that access authority of user F is extended (namely, it is changed from the state where nothing is permitted to the state where reading is permitted) while access authority of user C is unchanged, and thus access authority for the document 610 as a whole is extended compared to that before the ACL setting is changed (Yes at S702 in FIG. 7). Next, it is determined whether or not the extension of access authority of user F exceeds the range of access authority of user F for the top level folder 606 immediately above it (S704 in FIG. 7). Although the ACL setting for the folder 606 is previously changed as shown in FIG. 6B to "Read: C, D, E," the range of access authority of user F still exceeds that of access authority for the folder 606 even when comparing thereto. For that reason, it is determined that the top level folder for direct access should be newly created, and a top level folder 622 is created immediately under the root folder 600 (S706 in FIG. 7). As for access authority for the document 610 of user F, which is determined to exceed the range of access authority for the folder 606 immediately above it, the ACL regarding access authority of the range equal to or exceeding it is set in the top level folder 622 (S708 in FIG. 7). That is, the ACL, "permits read access to user F (Read: F)," is set in the top level folder 622.

By newly creating the top level folder 622 immediately under the root folder 600, the link with the root folder 600 as a source and the top level folder 622 as a target is additionally created in the link table. Aside from this, according to the embodiment of the present invention, the link for the top level folder 622 to refer to the document 610 for the resource content is additionally created (S710 in FIG. 7). Namely, in response to the change of the ACL setting for the document 610 illustrated in FIG. 6C, an entry (2) which defines the newly created top level folder 622 as a source and the document 610 as a target is additionally created in the link table as illustrated in Table 3(c), thus making it possible to refer to the document 610 from the top level folder 622. Here, the top level folder 622 has the ACL setting regarding access authority equivalent to access authority of user F extended access authority for the folder 606 immediately above it by the change of the ACL setting for the document 610, so that user F who accesses the top level folder 622 can access (read) the document 610 which is linked therefrom and includes equivalent access authority. As for the link type of the entry (2), the value "DIRECT" is set in a manner similar to the case of the entry (1).

Figure 6D:
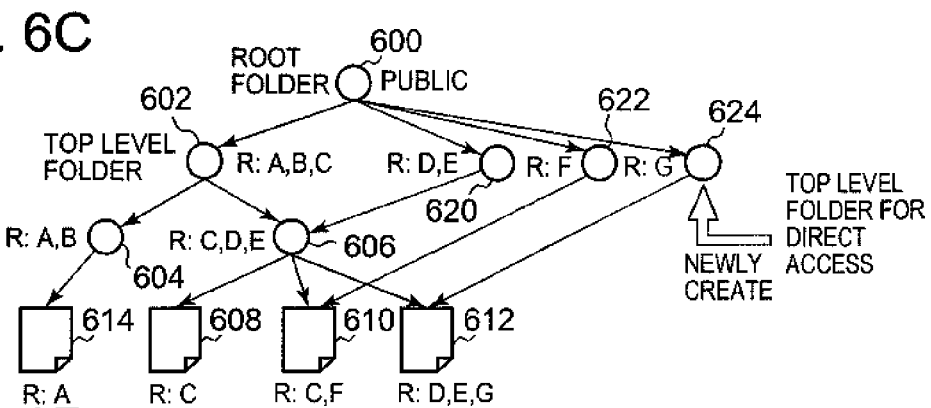

Furthermore, as shown in FIG. 6D, when the access authority is changed so as to permit the read access to a document 612 belonging to the folder 606 by users D, E, and G (namely, the ACL setting for the document 612 is set as "Read: D, E, G"), the processing proceeds to the step to determine whether or not the top level folder for direct access should be newly created immediately under the root folder 600 (Yes at S700 in FIG. 7). First, since the ACL setting for the document 610 is changed from "Read: C" to "Read: D, E, G," it is determined that access authority of users D, E, and G is extended (it is changed from the state where nothing is permitted to the state where reading is permitted) while access authority of user C is reduced (it is changed from the state where reading is permitted to the state where nothing is permitted), and thus access authority for the document 612 as a whole is extended compared to that before the ACL setting is changed (Yes at S702 in FIG. 7). Next, it is determined whether or not the extension of access authority of users D, E, and G exceeds the range of access authority of users D, E, and G for the top level folder 606 immediately above it (S704 in FIG. 7). The ACL setting for the folder 606 is previously changed as shown in FIG. 6B to "Read: C, D, E." In other words, the range of access authority of users D and E does not exceeds that for the folder 606 while the range of access authority of user G exceeds that for the folder 606. For that reason, it is determined that the top level folder for direct access should be newly created, and a top level folder 624 is created immediately under the root folder 600 (S706 in FIG. 7). As for access authority for the document 612 of user G, which is determined to exceed the range of access authority for the folder 606 immediately above it, the ACL regarding access authority of the range equal to or exceeding it is set in the top level folder 624 (S708 in FIG. 7). That is, the ACL, "permits read access to the user G (Read: G)," is set in the top level folder 624.

By newly creating the top level folder 624 immediately under the root folder 600, the link with the root folder 600 as a source and the top level folder 624 as a target is additionally created in the link table. Aside from this, according to the embodiment of the present invention, the link for the top level folder 624 to refer to the document 612 for the resource content is additionally created (S710 in FIG. 7). Namely, in response to the change of the ACL setting for the document 612 illustrated in FIG. 6D, an entry (3) which defines the newly created top level folder 624 as a source and the document 612 as a target is additionally created in the link table as illustrated in Table 3(d), thus making it possible to refer to the document 612 from the top level folder 624. Here, the top level folder 624 has the ACL setting regarding access authority equivalent to access authority of user G extended access authority for the folder 606 immediately above it by the change of the ACL setting for the document 612, so that user G who accesses the top level folder 624 can access (read) the document 612 which is linked therefrom and includes equivalent access authority. As for the link type of the entry (3), the value "DIRECT" is set in a manner similar to the case of the entries (1) and (2).

Figure 8A:
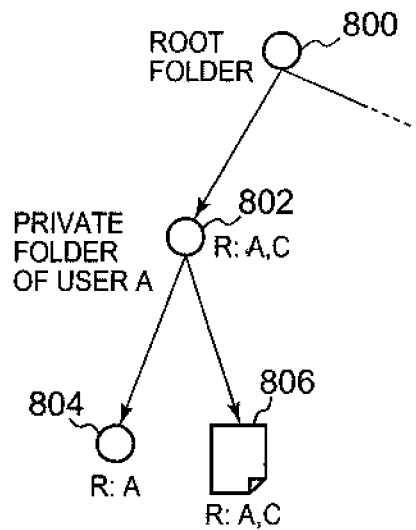
FIGS. 8A and 8B illustrate the mode in which a second embodiment according to the present invention is carried out for the tree-type logical hierarchy structure of the resource contents in the content sharing system for multi-user in FIG. 3.
Figure 8B:
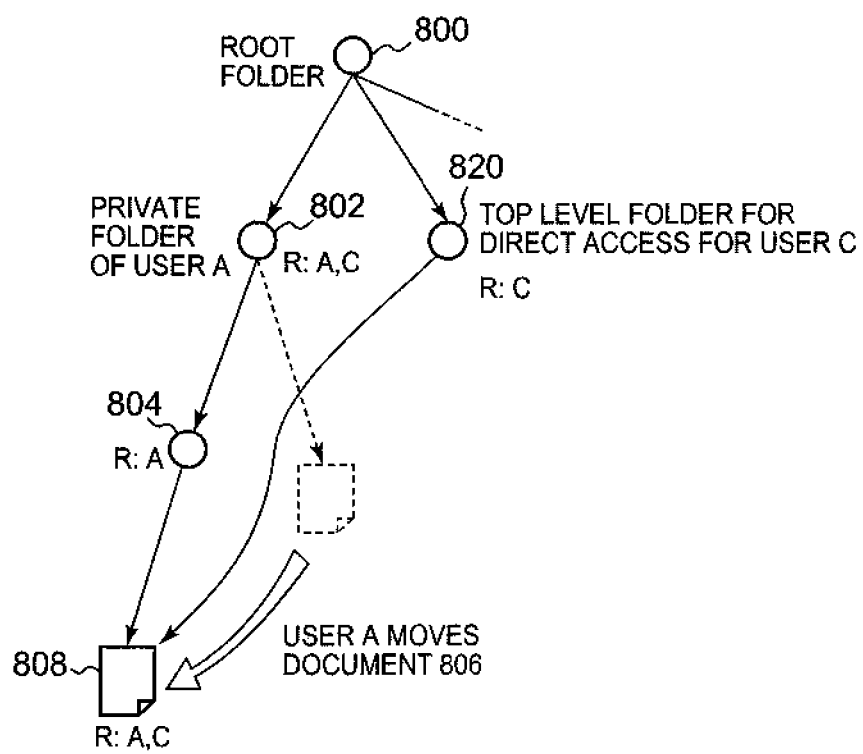

Next, as a second embodiment of the present invention, there will be described a case where an arbitrary resource content in the tree-type logical hierarchy structure is moved or copied by the user within this hierarchy structure. FIGS. 8A and 8B illustrate the mode in which the second embodiment according to the present invention is carried out for the tree-type logical hierarchy structure of the resource content configured in the server computer 320 and the content server 322 of the content sharing system for multi-user in FIG. 3. FIG. 7 can be used as the figure illustrating the flow of the whole processing of the second embodiment.

FIG. 8A illustrates a first state. Under a root folder 800, there is arranged one top level folder 802 where the ACL, "permits read access to the users A and C (Read: A, C)," is set up. Assume that the top level folder 802 sets some access authority of at least user A for private folders of the user A, namely, the lower-level resource content. A folder 804 and a document 806 are arranged immediately under the top level folder 802, where the ACL, "permits read access to the user A (Read: A)," is set for the folder 804 and the ACL, "permits read access to the users A and C (Read: A, C)," is set for the document 806. Since the range of access authority of this ACL setting is narrower than or equivalent to that set in the top level folder 802 immediately above it, it is not the meaningless setting, but functions effectively.

Here, as shown in FIG. 8B, in response to a case where the user A moves the position of the document 806 from the position immediately under the top level folder 802 to the position immediately under the folder 804 to establish a new document 808, the processing proceeds to the step to determine whether or not the top level folder for direct access should be newly created immediately under the root folder 800 (No at S700 in FIG. 7, Yes at S712). Since the ACL setting itself is not changed by moving the position of the document 806, it is not determined whether or not access authority based on the ACL setting for the document 808 itself is extended (the processing does not proceed through S702 in FIG. 7). However, it is determined whether or not access authority for the document 808 newly created immediately under the folder 804 exceeds resultingly the range of access authority of this folder 804 (S704 in FIG. 7). Since the ACL setting for the folder 804 is "Read: A," access authority to user C exceeds resultingly the range of access authority for the folder 804. For that reason, it is determined that the top level folder for direct access should be newly created, so that a top level folder 820 is created immediately under the root folder 800 (S706 in FIG. 7). As for access authority for the document 808 of user C, which is determined to exceed the range of access authority for the folder 804 immediately above it, the ACL regarding access authority with the range equal to or exceeding it is set in the top level folder 820 (S708 in FIG. 7). That is, the ACL, "permits read access to the user C (Read: C)," is set in the top level folder 820.

Since the document 806 immediately under the folder 802 is moved to the document 808 immediately under the folder 804, the link with the root folder 800 as a source and the top level folder 820 as a target is newly created in the link table by that the content of the entry in the link table regarding this movement is rewritten using the conventional mechanism and by that the top level folder 820 is newly created immediately under the root folder 800. Aside from them, according to the embodiment of the present invention, the link for the top level folder 820 to refer to the moved document 808 for the resource content is additionally created (S710 in FIG. 7). Tables 4 (a) and (b) illustrate how the link table changes according to the flow in FIGS. 8A and 8B. Namely, while the tree-type logical hierarchy structure of the initial resource content illustrated in FIG. 8A is achieved by the link table illustrated in Table 4(a), in response to the movement of the document 806 to the document 808 illustrated in FIG. 8B, an entry (4) which defines the newly created top level folder 820 as a source and the document 808 as a target is additionally created in the link table as illustrated in Table 4(b), thus making it possible to refer to the document 808 from the top level folder 820. Here, the top level folder 820 has the ACL setting regarding access authority equivalent to access authority of the user C to the document 808, which is determined to exceed the range of the access authority for the folder 804 immediately above it, so that user C who accesses the top level folder 820 can access (read) the document 808 which is linked therefrom and includes equivalent access authority. As for the link type of this entry (4), the value "DIRECT" is set in a manner similar to the case of the above entries (1) to (3).

TABLE 4

| SOURCE | TARGET | LINK TYPE |
|---|---|---|
| (a) LINK TABLE | | |
| ROOT FOLDER 800 | TOP LEVEL FOLDER 802 | FOLDER |
| TOP LEVEL FOLDER 802 | FOLDER 804 | FOLDER |
| TOP LEVEL FOLDER 802 | FOLDER 806 | FOLDER |
| (b) LINK TABLE | | |
| ROOT FOLDER 800 | TOP LEVEL FOLDER 802 | FOLDER |
| TOP LEVEL FOLDER 802 | FOLDER 804 | FOLDER |
| FOLDER 804 | DOCUMENT 808 | FOLDER |
| ROOT FOLDER 800 | TOP LEVEL FOLDER 820 | FOLDER |
| TOP LEVEL FOLDER 820 | DOCUMENT 808 | DIRECT⇐(4) |

When the document is not moved but copied, and when not the document but the folder is moved or copied, the processing proceeds in a manner similar to the above case when the document is moved. In the case where the document is copied, it is different from the case where the document is moved in that the entry of the link of the copy source remains in the link table after changing the entries in the link table. However, both cases are equivalent in view of carrying out the present invention. In the case where the folder is moved or copied, all the resource contents under the folder are also moved or copied, so that the present invention is applicable to each of these lower level resource contents and the top level folder for direct access is newly created appropriately if needed.

Figure 9:
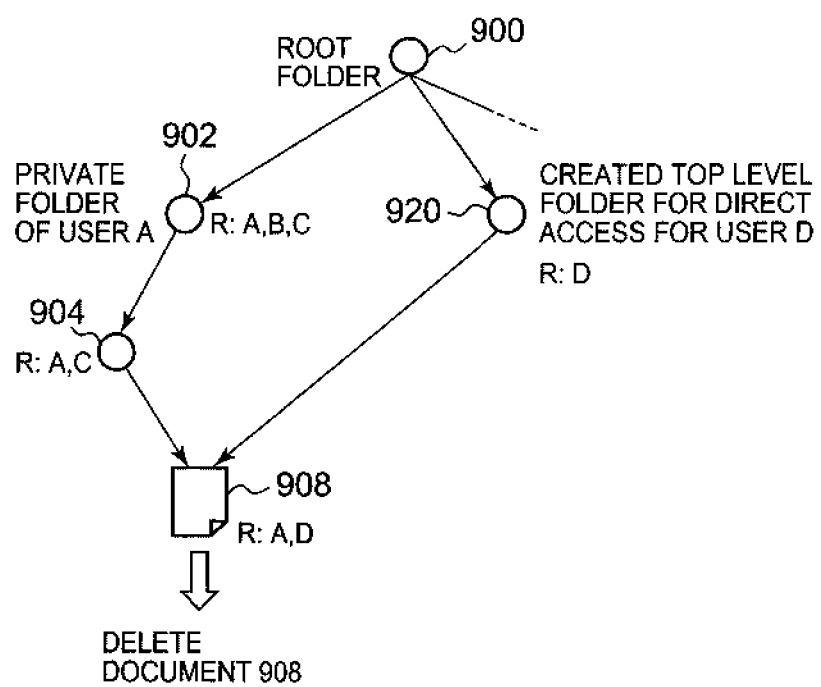
FIG. 9 illustrates the state immediately after creating a new top level folder for direct access based on the first or second embodiment according to the present invention for the tree-type logical hierarchy structure of the resource contents in the contents sharing system for multi-user in FIG. 3.

Next, as a third embodiment at another stage of the present invention, there will be described the operation in the stage after the new top level folder for direct access is created based on the first or second embodiment above. First, the operation will be described when the document of the folder is deleted. FIG. 9 illustrates the state after a new top level folder 920 for direct access is created immediately under a root folder 900 based on the first or second embodiment of the present invention for the tree-type logical hierarchy structure of the resource contents configured in the server computer 320 and the content server 322 of the contents sharing system for multi-user in FIG. 3. In addition, Table 5 illustrates the state of the link table corresponding to FIG. 9. As shown in FIG. 9, the top level folder 902 is the private folder of user A, and there is configured at its lower level the tree-type logical hierarchy structure constituted by the resource contents, each having some sort of the access authority to at least user A. Since the ACL, "permits read access to the users A and D (Read: A, D)," has been set for one document 908 in this tree-type logical hierarchy structure, the new top level folder 920 for direct access is created and the link is created, thus making it possible to directly access from the top level folder 920 to the document 908.

Here, suppose that user A deletes the document 908. At this time, all the entries in the link table are searched to enumerate all the entries which have the document 908 to be deleted serving as a target. Then, for each of the enumerated entries, it is confirmed whether or not it is the entry indicating the link with the top level folder for direct access as a source created based on the first embodiment. That is, in response to deletion of the document 908, it is confirmed whether or not there is the link from the top level folder 920 to the document 908. Specifically, in the link table of Table 5, the entry having the document 908 in the target column is searched first, then it is confirmed whether or not the link type is "DIRECT" for each of the relevant entries, and an entry (5) with the top level folder 920 as a source and the document 908 as a target is found. Thereafter, this entry (5) is deleted from the link table, and the top level folder 920 is also deleted continuously. As described above, according to the third embodiment of the present invention, the top level folder created based on the first or second embodiment or the link from the top level folder to the document or the folder can be deleted when it becomes unnecessary by the relevant document or folder being deleted without the user involving in any way.

TABLE 5

LINK TABLE

| SOURCE | TARGET | LINK TYPE |
| --- | --- | --- |
| ROOT FOLDER 900 | TOP LEVEL FOLDER 902 | FOLDER |
| TOP LEVEL FOLDER 902 | FOLDER 904 | FOLDER |
| FOLDER 904 | DOCUMENT 908 | FOLDER |
| ROOT FOLDER 900 | TOP LEVEL FOLDER 920 | FOLDER |
| TOP LEVEL FOLDER 920 | DOCUMENT 908 | DIRECT⇐(5) |

As described above, when the number of the new top level folders for direct access created according to the present invention increases in response to the change of the ACL setting for an arbitrary resource content in the logical hierarchy structure or the movement or copying of the resource content, the need arises to consider to reorganize and integrate these increased top level folders. In this case, by providing the user with service "integration of folders" as a fourth embodiment, the extension of the first through third embodiments of the present invention, the user can easily reorganize and integrate the folders which have become complicated.

Figure 10A:
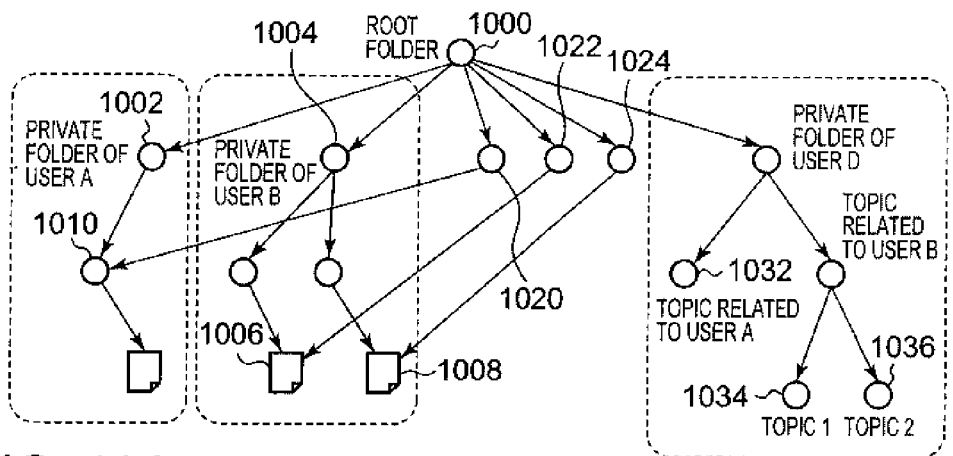
FIG. 10 illustrates organization and integration of the top level folders for direct access created previously based on a fourth embodiment according to the present invention.
Figure 10B:
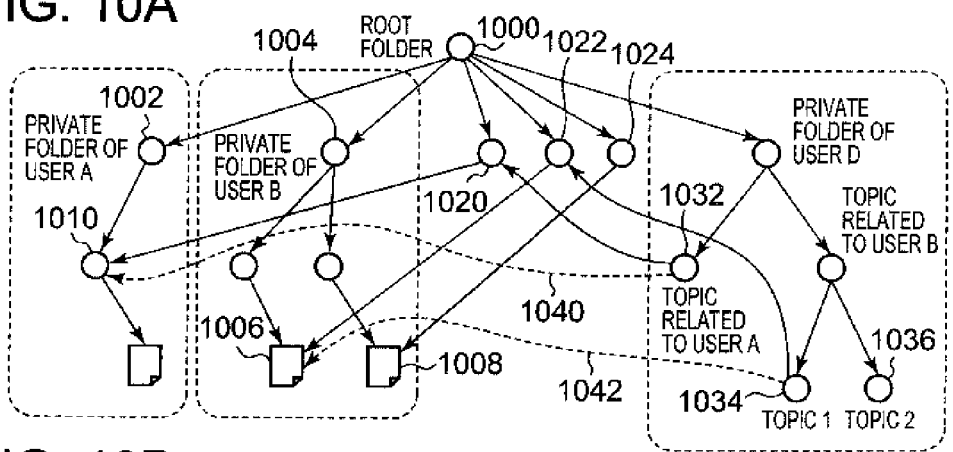
Figure 10C:
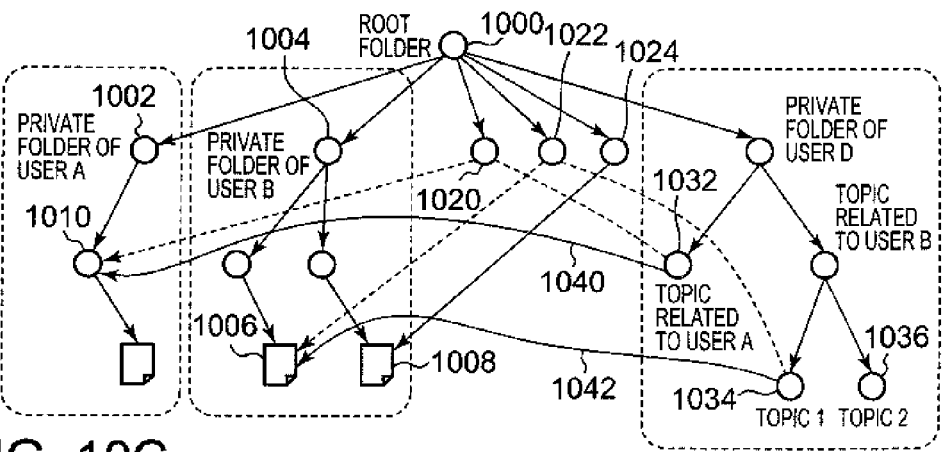

FIGS. 10A to 10C illustrate reorganization and integration, according to the fourth embodiment of the present invention, of the top level folders for direct access newly created by the first or second embodiment of the present invention. FIG. 10A illustrates the state after some top level folders 1020, 1022, and 1024 for direct access which define access authority of user D are created after the first or second embodiment of the present invention has been carried out for several times. The top level folder 1020 is linked to a folder 1010 in the logical hierarchy structure under a top level folder 1002 as the private folder of user A, where the ACL setting regarding the access authority, which is equivalent to access authority of user D set for the folder 1010, is also set in the top level folder 1020. In addition, the top level folders 1022 and 1024 are linked respectively to documents 1006 and 1008 in the logical hierarchy structure under a top level folder 1004 as the private folder of the user B, where the ACL settings regarding access authority, which is equivalent to access authority of user D set for the documents 1006 and 1008, are also set in the top level folders 1022 and 1024, respectively. Here, assume that the logical hierarchy structure has already been configured under a top level folder other than the top level folders 1020, 1022, and 1024 before these top level folders are created.

According to the fourth embodiment of the present invention, in response to a request from an arbitrary user, a list of newly created top level folders for direct access which this user can access can be displayed to this user. That is, in the case shown in FIG. 10A, in response to the request by user D for inquiring the newly created top level folders for which user D has access authority at present, the list indicating the top level folders 1020, 1022, and 1024 is displayed to user D. Regarding each of all or some of these top level folders, user D can designate a certain folder under its private folder in the logical hierarchical structure, from which the top level folder can be accessed. For example, the user can designate that the top level folder 1020 can be accessed from the folder 1032 and the top level folder 1022 can be accessed from the folder 1034, respectively, while there is no designation regarding the top level folder 1024. In response to this designation by user D, the link is created from the folder 1032 to the top level folder 1020 by adding the entry of the link between the folder 1032 as a source and the top level folder 1020 as a target to the link table. Similarly, the link is created from the folder 1034 to the top level folder 1022 by adding the entry with the folder 1034 as a source and the top level folder 1022 as a target. Here, since user D has not designated, the link to the top level folder 1024 is not created from any folders in the logical hierarchy structure under the private folder of the user D. FIG. 10B illustrates the state after these links are created.

By creating this link, user D can access from the folder 1032 under its private folder to the folder 1010 under the private folder of user A through the top level folder 1020, and can similarly access from the folder 1034 under its private folder to the document 1006 under the private folder of user B through the top level folder 1022. Namely, the resource contents, which are not within the range under the private folder of user D but for which the ACL is set to permit the access from user D, can be accessed using one of the folders reorganized by categories within the hierarchy structure under the private folder of user D as an origin. Consequently, the need is eliminated to be conscious of the presence of the top level folders 1020, 1022, and 1024 for direct access created initially for accessing these resource content based on the first or second embodiment of the present invention. (See dashed line arrows 1040 and 1042 in FIG. 10B)

Instead of creating the link from the folder 1032 in the private folder of user D to the top level folder 1020, the link may be created directly from the folder 1032 to the folder 1010 to which the top level folder 1020 is linked. In this case, since the top level folder 1020 becomes not essential for accessing the folder 1010, the link from the top level folder 1020 to the folder 1010 is deleted and the top level folder 1020 itself may be deleted. Similarly, instead of creating the link from the folder 1034 in the private folder of user D to the top level folder 1022, the link may be created directly from the folder 1034 to the document 1006 to which the top level folder 1022 is linked. In this case, the link from the top level folder 1022 to the document 1006 as well as the top level folder 1022 itself may be deleted. FIG. 10C illustrates the state after these direct links 1040 and 1042 are created.

By creating this direct link, user D can access directly from the folder 1032 under its private folder to the folder 1010, for which the ACL is set to permit the access from the user D, under the private folder of user A without going through the top level folder 1020, and similarly can access directly from the folder 1034 under his/her own private folder to the document 1006, for which the ACL is set to permit the access from the user D, under the private folder of the user B without going through the top level folder 1022. In this case as well, the resource content, which are not within the range under the private folder of user D but for which the ACL is set to permit the access from the user D, can be accessed using one of the folders reorganized by categories within the hierarchy structure under the private folder of the user D as an origin. Consequently, the need is eliminated of the presence of the top level folders 1020, 1022, and 1024 for direct access created initially for accessing these resource content based on the first or second embodiment of the present invention, and thus they may be deleted.

As described above, in accordance with the designation by the user, the integrative access becomes possible from the specific reorganized folders in the hierarchy structure under this user to all the resource content with permission of the access by this user, including the resource content to which this user has the access permission given by the user other than this user, resulting in significant improvement of user operability in this content sharing system by multi-user.

While the present invention has been described using some embodiments, the technical scope of the present invention is apparently not limited to the scope described in the above embodiments. It is obvious to those skilled in the art that a wide variety of modifications or improvements can be made to the above embodiments. Moreover, it is obvious from the description of claims that such modified or improved forms may be included within the technical scope of the present invention.

What is claimed is:

1. A method of managing access to documents or folders by users, by execution of computer code by a processor of a computer, in accordance with access authority set for each user with respect to each document or folder, in a contents sharing system for sharing access to documents or folders by a plurality of users, the method comprising the steps of:
    determining, for an arbitrary document or folder in a logical hierarchy structure including documents and folders logically associated with each other and arranged hierarchically under a root folder, whether or not a range of access authority set for at least one user with respect to the document or folder exceeds a range of access authority set for the user with respect to a folder positioned immediately above the document or folder in the hierarchy structure;
    creating, in the case where the exceeding is determined in the determining step, a new folder for direct access immediately under a predetermined folder in the hierarchy structure, and setting access authority with respect to the new folder for direct access with a range equal to or exceeding the range of access authority set for the user with respect to the document or folder; and
    creating an access link with the new folder for direct access as a source and the document or folder as a target, subsequent to the creating and setting step.

2. The method according to claim 1, wherein the predetermined folder in the hierarchy structure is the root folder.

3. The method according to claim 1, further comprising the step of deleting the access link and the new folder for direct access in response to deleting the document or folder serving as a target in the access link.

4. The method according to claim 1, wherein the determining step comprises the step of determining, in response to change in contents of access authority set with respect to the document or folder, whether or not a range of access authority set for at least one user with respect to the document or folder after the change exceeds a range of access authority set for the user with respect to a folder positioned immediately above the document or folder in the hierarchy structure.

5. The method according to claim 1, wherein the determining step comprises the step of determining, in response to creation of a new document or folder at a moving or copying destination by moving or copying an arbitrary document or folder in the hierarchy structure, whether or not a range of access authority set for at least one user with respect to a document or folder at the moving or copying destination exceeds a range of access authority set for the user with respect to a folder positioned immediately above the document or folder at the moving or copying destination in the hierarchy structure.

6. The method according to claim 5, wherein the one moved or copied is a folder, the method further comprising the step of repeating, for each of all the documents and folders positioned under the newly created folder at the moving or copying destination, the steps of:
    determining whether or not a range of access authority set for at least one user with respect to the document or folder exceeds the range of access authority set for the user with respect to the folder positioned immediately above the folder at the moving or copying destination;
    creating, in the case where the exceeding is determined in the determining step, a new folder for direct access immediately under a predetermined folder in the hierarchy structure, and setting access authority with respect to the folder for direct access with a range equal to or exceeding the range of access authority set for the user with respect to the document or folder; and
    creating an access link with the folder for direct access as a source and the document or folder as a target, subsequent to the setting step.

7. The method according to claim 6, further comprising, in response to deletion of the folder at the moving or copying destination, and, for each of all the documents and folders positioned under the folder at the moving or copying destination, the step of repeating the steps of:
    deleting the access link with the folder for direct access as a source and the document or folder as a target, if the access link is present; and
    deleting the folder for direct access.

8. A system for managing access to documents or folders by users, via execution of computer code by a processor of a computer, in accordance with access authority set for each user with respect to each document or folder, in a contents sharing system for sharing access to documents or folders by a plurality of users, the system comprising:
    a processor of a computer;
    a determining part for determining, for an arbitrary document or folder in a logical hierarchy structure including documents and folders logically associated with each other and arranged hierarchically under a root folder, whether or not a range of access authority set for at least one user with respect to the document or folder exceeds a range of access authority set for the user with respect to a folder positioned immediately above the document or folder in the hierarchy structure;
    a creating and setting part for creating, in the case where the exceeding is determined in the determining part, a new folder for direct access immediately under a predetermined folder in the hierarchy structure, and setting access authority with respect to the new folder for direct access with a range equal to or exceeding the range of access authority set for the user with respect to the document or folder; and a link creation part for creating an access link with the new folder for direct access as a source and the document or folder as a target, subsequent to processing by the creating and setting part.

9. The system according to claim 8, wherein the predetermined folder in the hierarchy structure is the root folder.

10. The system according to claim 8, further comprising a deletion part for deleting the access link and the new folder for direct access in response to deleting the document or folder serving as a target in the access link.

11. The system according to claim 8, wherein the determining part determines, in response to change in contents of access authority set with respect to the document or folder, whether or not the range of access authority set for at least one user with respect to the document or folder after the change exceeds a range of access authority set for the user with respect to a folder positioned immediately above the document or folder in the hierarchy structure.

12. The system according to claim 8, wherein the determining part determines, in response to creation of a new document or folder at a moving or copying destination by moving or copying an arbitrary document or folder in the hierarchy structure, whether or not a range of access authority set for at least one user with respect to a document or folder at the moving or copying destination exceeds a range of access authority set for the user with respect to a folder positioned immediately above the document or folder at the moving or copying destination in the hierarchy structure.

13. A program product stored on a computer-readable storage memory for causing a computer to execute instructions for managing access to documents or folders by users in accordance with access authority set for each user with respect to each document or folder in a contents sharing system for sharing access to documents or folders by a plurality of users, the method comprising the steps of:

determining, for an arbitrary document or folder in a logical hierarchy structure including documents and folders associated with each other and arranged hierarchically under a root folder, whether or not a range of access authority set for at least one user with respect to the document or folder exceeds a range of access authority set for the user with respect to the folder positioned immediately above the document or folder in the hierarchy structure;

creating, in the case where the exceeding is determined in the determining step, a new folder for direct access immediately under a predetermined folder in the hierarchy structure, and setting access authority with respect to the new folder for direct access with a range equal to or exceeding the range of access authority for the user with respect to the document or folder; and creating an access link with the new folder for direct access as a source and the document or folder as a target, subsequent to the creating and setting step.

14. The program product according to claim 13, wherein the predetermined folder in the hierarchy structure is the root folder.

15. The program product according to claim 13, wherein the method further comprises the step of deleting the access link and the new folder for direct access in response to deletion of the document or folder serving as a target in the access link.

16. The program product according to claim 13, wherein the determining step comprises the step of determining, in response to change in contents of access authority set with respect to the document or folder, whether or not a range of access authority set for at least one user with respect to the document or folder after the change exceeds a range of access authority set for the user with respect to a folder immediately above the document or folder in the hierarchy structure.

17. The program product according to claim 13, wherein the determining step comprises the step of determining, in response to creation of a new document or folder at a moving or copying destination by moving or copying an arbitrary document or folder in the hierarchy structure, whether or not a range of access authority set for at least one user with respect to a document or folder at the moving or copying destination exceeds a range of access authority set for the user with respect to a folder positioned immediately above the document or folder at the moving or copying destination in the hierarchy structure.

18. A method of managing access to documents or folders by users, by execution of computer code by a processor of a computer, in accordance with access authority set for each user with respect to each document or folder, in a contents sharing system for sharing access to documents or folders by a plurality of users, the method comprising the steps of:

determining, for an arbitrary document or folder in a logical hierarchy structure including documents and folders logically associated with each other and arranged hierarchically under a root folder, whether or not a range of access authority set for at least one user with respect to the document or folder exceeds a range of access authority set for the user with respect to a folder positioned immediately above the document or folder in the hierarchy structure;

creating, in the case where the exceeding is determined in the determining step, a new folder for direct access immediately under a predetermined folder in the hierarchy structure, and setting access authority with respect to the new folder for direct access with a range equal to or exceeding the range of access authority set for the user with respect to the document or folder;

creating an access link with the new folder for direct access as a source and the document or folder as a target, subsequent to the creating and setting step;

displaying a list of all the folders for direct access in which access authority for the user is set for the user, in response to a request by the user; and creating, for each of all the displayed folders for direct access, a second access link with the predetermined folder as a source and the folder for direct access as a target, in response to designation by the user to intend to access the document or folder at a link destination of the folder for direct access from an existing predetermined folder to which the user can access other than all the folders for direct access.

19. A method of managing access to documents or folders by users, by execution of computer code by a processor of a computer in accordance with access authority set for each user for each document or folder in a contents sharing system for sharing access to documents or folders by a plurality of users, the method comprising the steps of:

determining, for an arbitrary document or folder in a logical hierarchy structure logically associated with each other and arranged hierarchically under a root folder, whether or not a range of access authority set for at least one user with respect to the document or folder exceeds a range of access authority set for the user with respect to a folder positioned immediately above the document or folder in the hierarchy structure;

creating, in the case where the exceeding is determined in the determining step, a new folder for direct access immediately under a predetermined folder in the hierarchy structure, and setting access authority with respect to the new folder for direct access with a range equal to or exceeding the range of access authority set for the user with respect to the document or folder;

creating an access link with the new folder for direct access as a source and the document or folder as a target, subsequent to the creating and setting step;

displaying a list of all the folders for direct access for which the access authority for the user is set for the user, in response to a request by the user; and creating, for each of all the displayed folders for direct access, a second access link with the predetermined folder as a source and the document or folder at the link destination as a target, in response to designation by the user to intend to access the document or folder at a link destination of the folder for direct access from an existing predetermined folder to which the user can access other than all the folders for direct access.

* * * * *